Patented June 5, 1923.

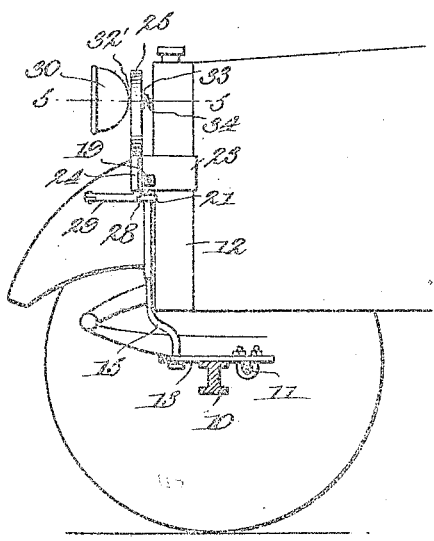

1,458,035

UNITED STATES PATENT OFFICE.

MAGGIE THOMPSON DAVISON, OF NASHVILLE, TENNESSEE, AND CHARLES WILES THOMPSON, OF CHICAGO, ILLINOIS.

AUTOMOBILE LIGHT.

Application filed December 6, 1921. Serial No. 520,378.

*To all whom it may concern:*

Be it known that we, MAGGIE THOMPSON DAVISON and CHARLES WILES THOMPSON, citizens of the United States, residing at Nashville and Chicago, respectively, in the counties of Davidson and Cook, respectively, and States of Tennessee and Illinois, respectively, have invented new and useful Improvements in Automobile Lights, of which the following is a specification.

This invention relates to automobile lights and particularly to movable or dirigible lights, and the principal objects are to produce a device of this nature which shall be simple of construction, cheap to manufacture, and highly efficient for the purpose for which it is designed.

Another object is to provide auxiliary lights which may be readily and quickly attached and removed.

Another object is to provide automobile lights which shall be movable automatically by turning the wheels, and which when so turned will move through a greater arc than the wheels.

With these and other objects in view which will be more apparent as the specification proceeds, the invention resides in certain novel construction and combination and arrangement of parts the essential features of which are hereinafter fully described, are particularly pointed out in the appended claims, and are illustrated in the accompanying drawing, in which:—

Figure 1 is a side view of a portion of an automobile radiator with our device in place, parts being shown in section.

Figure 2 is a front elevation of the same.

Figure 3 is a detached view of one of the lamp holders.

Figure 4 is a detached view of the lamp operating frame and its operating rod.

Figure 5 is a horizontal section on line 5—5 of Figure 1.

Like characters of reference refer to like parts in all views.

Referring to the drawing in detail, 10 represents the front axle of an automobile; 11, the wheel-operating tie rod; and 12, the radiator frame.

Secured to the center of tie rod 11 and extending forwardly therefrom is a comparatively short member 13 having an aperture 14 formed in its front portion. The lower end of a rod 15 which may be made adjustable as to length at 16, extends through the aperture 14. The upper portion of rod 15 is squared at 17 and above this provided with a cylindrical portion 18 mounted for free turning in a bearing in a cross rod 19, and held in said bearing by a screw 20.

The square portion 17 carries a forwardly extending member 21 which is pivotally connected at its front end with the center of a rod 22.

Secured to the frame 12 of the radiator are a pair of brackets 23 which may be secured to the said frame 12 by screws or other suitable means, and which are connected by the rod 19, above described. Each member 23 is provided with a vertical bearing 24 the ends of which are embraced by respective ears 26 and 27 of a lamp holder 25. The upper ear 27 of each holder 25 has a square aperture, and a rod 28 passing through the lower ear 26 and bearing 24 has its squared upper end secured in the square aperture of ear 27, so that upon turning the rods, the lamp holders 25 will also be turned.

Each rod 28 is formed with a forwardly extending arm 29 which is pivotally secured to the respective end of the rod 22.

It will now be readily understood that when the steering rod 11 is moved to the right or left, the member 13 will be moved thereby so that the lower offset portion of bar 16 will be moved to rotate said bar and thereby turn member 21, bar 22 and lamp holder 25 accordingly.

The lamps which are smaller than ordinary headlights, are indicated at 30, and each is formed with a rearwardly extending shank 31 which is of square cross section near the lamp body, and provided with threads at its rear end. A washer 32 is placed over the shank 31, and then the shank is inserted through an aperture 35 in the respective lamp holder 25. A washer 33 is then slipped on the shank 31 in rear of the lamp holder, and a nut 34 is tightened into place. It will be noticed that the aperture 35 is made in the form of a cross so that the lamp may be adjusted vertically and horizontally to various positions, and then maintained in said position by tightening the nut 34.

While we have described what we deem to be the most desirable embodiments of our invention, it is obvious that many of the details may be varied without in any way departing from the spirit of our invention, and we therefore do not limit ourselves to the exact details of construction herein set forth nor to anything less than the whole of our invention limited only by the appended claims.

What is claimed as new is:—

1. In a device of the class described, the combination with a steering rod, a link secured thereto, an offset rod having one end freely operable by said link, said offset rod being vertically adjustable, a forwardly extending rod connected to said offset rod and operable thereby, a transverse bar connected to the front of said forwardly extending rod, rearwardly extending rods connected to the ends of said transverse rods and having a portion bent upwardly for the reception of lamp holders, the said lamp holders operable by said bar, a radiator, bracket secured to said radiator and having bearings for freely supporting said lamp holders and auxiliary lamps adjustably supported by said lamp holders.

2. In a device of the class described, the combination with the radiator and steering rod of an automobile, of clamps secured to said radiator and formed with bearing elements, shafts rotatably mounted in said bearing elements, lamp holders secured to said members for movement thereby, said lamp holders provided with vertical and horizontally arranged slots, lamps mounted on said lamp holders and capable of adjustment in said slots, and means automatically operable by said steering rod for operating said members.

In testimony whereof we have affixed our signatures.

Mrs. MAGGIE THOMPSON DAVISON.
CHARLES WILES THOMPSON.